Aug. 13, 1957 R. L. MAXWELL 2,802,435
LIQUID FERTILIZER FLOW CONTROL
Filed Jan. 22, 1954 2 Sheets-Sheet 1
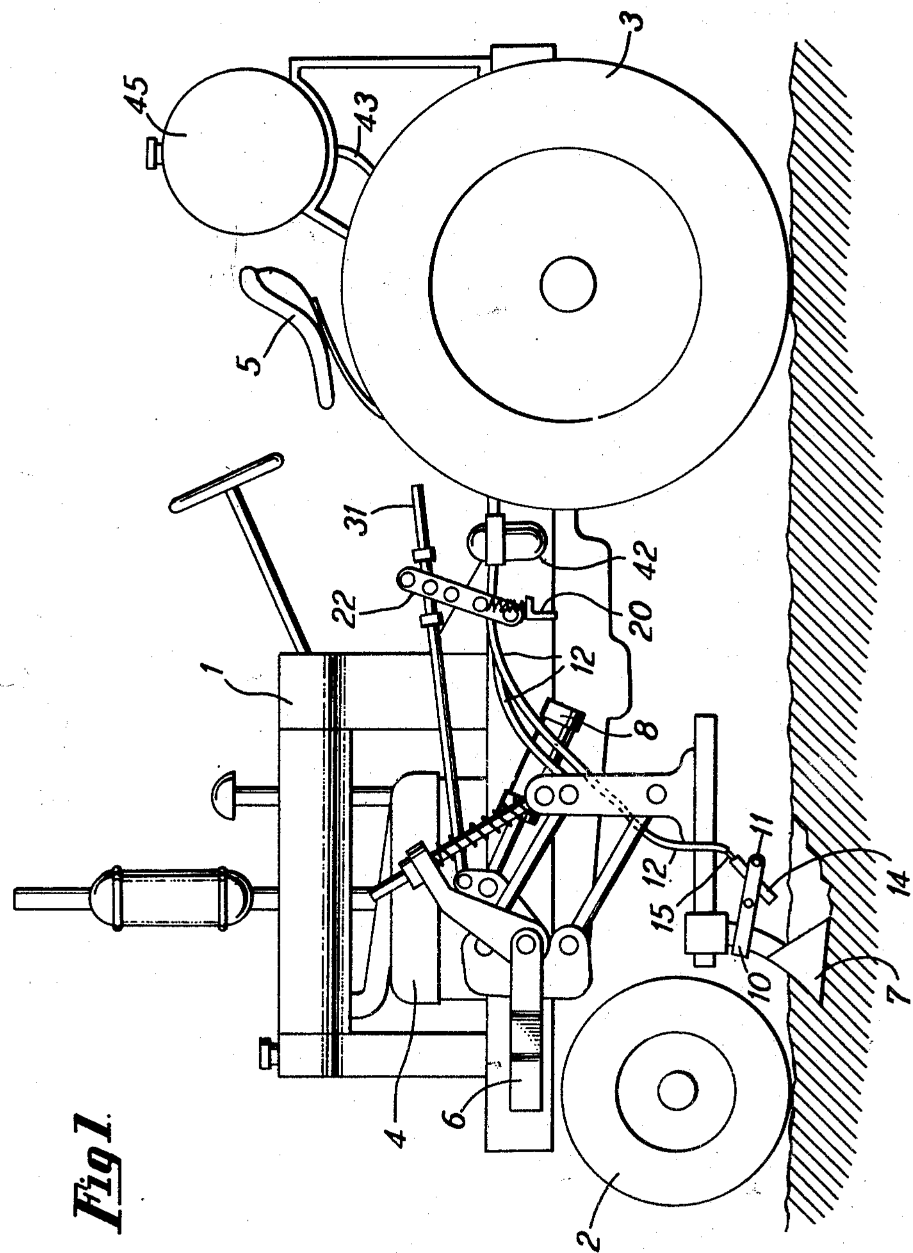
INVENTOR.
RODNEY L. MAXWELL
BY Robert V. Moss
Atty.

LIQUID FERTILIZER FLOW CONTROL
Filed Jan. 22, 1954 2 Sheets-Sheet 2
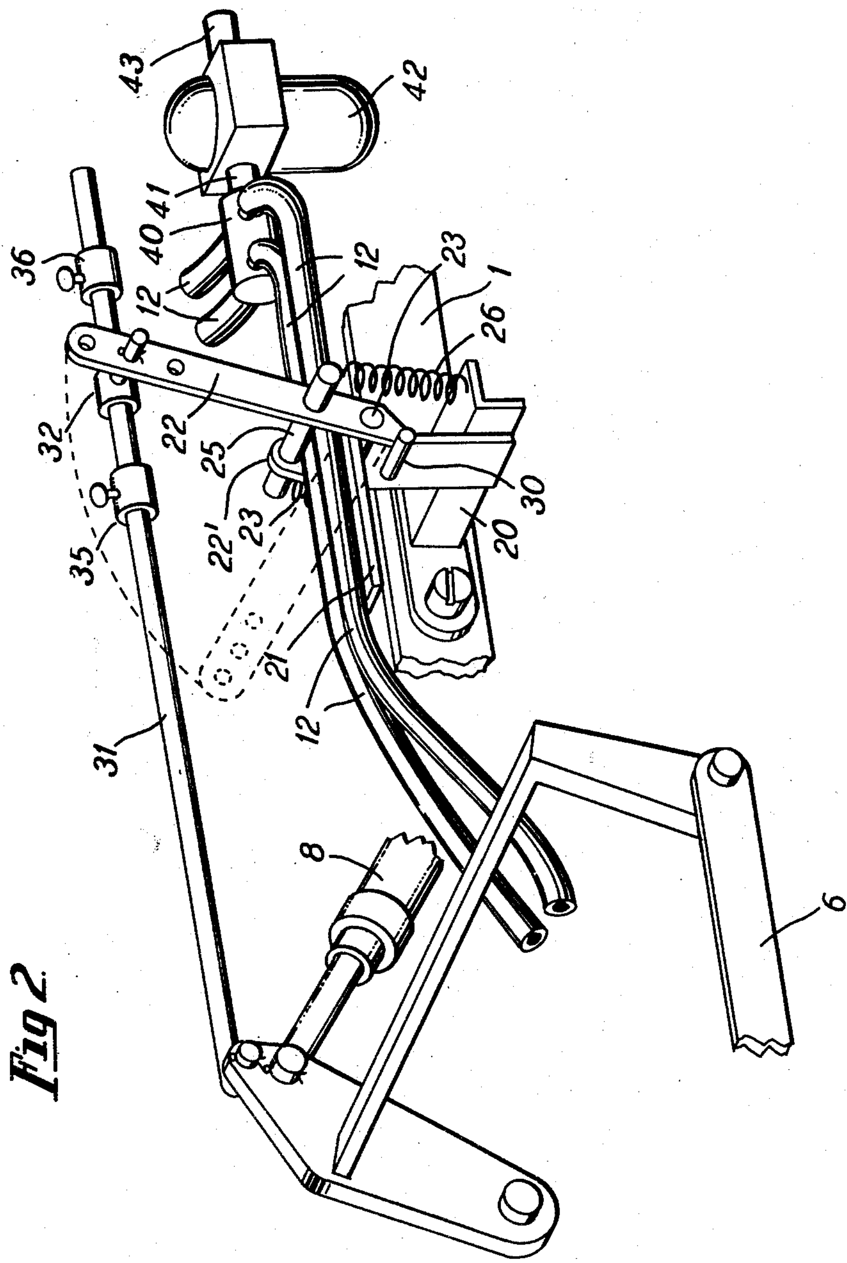
INVENTOR.
RODNEY L. MAXWELL
BY Robert V. Morse
Atty.

United States Patent Office 2,802,435
Patented Aug. 13, 1957

1

2,802,435

LIQUID FERTILIZER FLOW CONTROL

Rodney L. Maxwell, Candor, N. Y., assignor to Cooperative Grange League Federation Exchange, Inc., Ithaca, N. Y., a corporation of New York Application January 22, 1954, Serial No. 405,623

1 Claim. (Cl. 111—7)

This invention relates to the fertilization of the soil in which crops are grown. It is generally known that most crops tend to deplete the soil of nitrogen, which must be restored by nature's slow processes or by some artificial means. It has been proposed to inject nitrogen at high pressure into the ground, and that has been done by various devices with some success; but such injection has had to be rather deep in the ground in order not to blow out, and such high pressures are somewhat dangerous and difficult to handle, particularly on a farm. Liquid solutions containing nitrogen have also been used to avoid such dangers, but they are generally corrosive and tend to clog the piping and valves if not thoroughly cleaned out. To satisfy the needs of an average farm, it is necessary that machines for this purpose be capable of inspection and repair without using too much of the farmer's time, and that they be safe and efficient.

The principal object of the present invention is to produce a practical machine to plow a shallow furrow, inject a low pressure nitrogen containing liquid into it, and to provide automatic control and cut-off mechanisms which can operate satisfactorily under service conditions and which can be easily cleaned and kept in repair by the farmer. By solving the operating problems in a practical manner it is hoped to encourage the more widespread use of nitrogen implanting machines to the general benefit of agriculture, particularly in run down and depleted areas. The machine herein described is safe and can be produced at a cost that will permit the average farmer who has a tractor cultivator to use it.

Referring now to the drawings forming part of this specification,

Fig. 1 is a side elevation of the machine as applied to a typical tractor, showing the mechanism in the operating position delivering nitrogenous liquid to a furrow.

Fig. 2 is a side elevation on a larger scale showing the cut-off and flow control mechanism.

Similar reference numerals refer to similar parts thruout the various views.

Referring now to Fig. 1, there is shown an agricultural tractor 1 of the type having front wheels 2, rear wheels 3, a power plant 4, and a seat 5 near the rear, together with the usual equipment and controls for driving and steering. On outriggers 6 on the forward part of the tractor is mounted a multiple plow mechanism which can be brought into action when desired. This consists of a transverse row of cutting plows 7 usually two in number on a side, which turn the soil between the rows to be cultivated, leaving furrows into which the earth falls back after the nitrogen solution has been injected into them. These sets of plows 7 and their associated mechanisms are on both sides of the front of the tractor somewhat behind the front wheels, and the rigidly braced outriggers 6 provide a secure foundation for the plowing and nitrogenizing mechanism. The plows 7 are raised and lowered at will by hydraulic power 8 controlled by the driver of

2 the vehicle, as is customarily done in the modern types of cultivator-tractors.

Directly behind each plow 7 there is mounted a bracket 10 which extends rearwardly and has on its free end an adjustable clamp 11 which holds the hose 12 and nozzles 14 pointing down toward the open part of the furrow which the plow will have just opened as the cultivator tractor moves along. The nozzle 14 has a small orifice—usually about 1/16 to 1/8 inch in diameter—from which a stream of the nitrogen bearing fluid can be directed into the earth. Each nozzle 14 has a neck 15 consisting of a tube which extends up into the end of the hose 12, which is generally held on by friction, reenforced by a hose clamp if desired.

The hose 12 is not hard or stiff walled, as would be the case if flexible metallic tubing or pipes were used, but it is made of soft rubber or plastic tubing capable of carrying a moderate pressure inside but readily collapsable under pressure from the outside, so that it can be pinched to shut off the flow.

Referring now to Fig. 2, where the flow control mechanism is shown on a larger scale, there is secured to the main frame of the tractor 1 a projecting bracket 20 having mounted thereon a bed-plate 21 over which the hoses 12 pass. An arm 22 is pivotally mounted at 23 on the lower side of the bed-plate 21, and a shorter stub-arm 22' is similarly mounted on the other side of the hoses 12, so that the hoses 12 pass between the two pivoted arms 22 and 22' as the hoses extend over the bed-plate 21. A transverse bar 25 extends between the arms 22 and 22' just above the hoses 12 so as to hold them in place but not to pinch them when the arm 22 is in the open or plowing position.

Attached to the ends of the movable bar 25 are tension springs 26 whose other ends are secured to the bracket 20 at points off dead center of the pivot 23, so that the springs 26 will tend to hold the arm 22 in one or the other of its extreme operating positions but not at dead center. In the position shown in full lines in Fig. 2 the arm 22 is at the right, meeting a stop 30 on the fixed bracket 20; and the hoses 12 are not constricted, whereby a fluid may flow freely thru them. When the arm 22 is swung on the pivot 23 to the position shown in broken lines, the tension of the springs 26 helps to hold the bar 25 hard down on the hoses 12, pinching them against the bed-plate 21 and cutting off the flow.

The arm 22 has fixed to its upper portion a collar 32 thru which extends a rod 31 connected to the operating mechanism for the plows 7. Adjustable clamped collars 35 and 36 on the rod 31 engage the collar 32 and determine the play of the operating rod 31 by which the arm 22 is moved. When the plows 7 are raised the connecting rod 31 is moved forward, swinging the arm 22 forward and cutting off the flow of liquid in the hoses 12 by the action of the bar 25. When the plows 7 are lowered into the ground and the cultivator is in operation, the arm 22 is swung backward and the pressure of the bar 25 on the hoses 12 is released, whereupon the hoses 12 open by their natural resilience and allow a flow of liquid which is injected into the ground just behind the plows. This carries the nitrogen into the earth, and the displaced soil falls back into the furrow shortly afterwards according to the normal speed of the tractor, so that the nitrogenous fluid is held in the ground and little is lost by evaporation.

There is a hose 12 and nozzle 14 for each plow 7—and since there are usually two such plows 7 on each side of the tractor, that is one on each side of the two rows cultivated—there are generally four nozzles in all. There are accordingly four hoses 12 which are fed from a manifold 40 that has an intake pipe 41 and four outlets to the hoses 12, or as many as are required. The intake pipe 41 is fed thru a filter 42 to screen out any foreign particles that might clog the system, this filter 42 being connected by the hose 43 to the tank 45, which is preferably mounted behind the driver's seat and at the back of the tractor 1. The flow is by gravity, and such a location of the tank 45 relative to the ground provides an hydraulic head of about four feet which is sufficient to produce a good jet of liquid at the nozzles 14.

The entire equipment can be readily cleaned, serviced and repaired in the field by any farmer capable of handling a tractor and can be installed at a reasonable cost, so as to encourage the preservation of fertility by nitrogen treatment.

While I have in the foregoing described certain specific forms by way of example, it will be understood that they are merely for purposes of illustration to make clear the principles of the invention, which is not limited to the particular forms shown but is susceptible to various modifications and adaptations in different installations as will be apparent to those skilled in the art without departing from the scope of the invention as stated in the following claim.

I claim:

In farm apparatus for applying nitrogen to the soil, the combination of a tractor having a transverse row of cultivating plows to turn the soil between the rows being cultivated, a power driven elevating and lowering mechanism for said plows controllable by the operator of the tractor, brackets extending rearwardly attached to said plows, the rear free ends of the brackets carrying nozzle clamps, nozzles in said clamps, flexible hoses attached to said nozzles, said nozzles being directed downward into the open parts of the furrows behind the plows as the tractor progresses, said flexible hoses extending upward from the nozzles, a bed plate attached to the tractor, said hoses extending over said bed plate and being sufficiently collapsible at that point so that they can be closed by exterior compression, a pivot on one side of said bed plate, a movable arm mounted on said pivot, a bar operated by said arm, said bar cooperating with said bed plate so as to close the hoses by pressure exerted by said arm, a spring connected to the arm with its maximum force at an intermediate position in the travel of said arm so as to force the arm to either one of its extreme positions and prevent dwelling at dead center, a connecting rod from the arm to the elevating and lowering mechanism of the plows, a collar attached to the arm and slidably mounted on said connecting rod, a pair of adjustable collars affixed to said rod, one on each side of the collar on the arm and spaced therefrom to provide for intermediate play of the rod and to operate the arm at the extreme positions of travel of the rod so that the clamping action on the hoses on the bed plate is either full on or completely off, said connecting rod being actuated to close the hoses when the plows are elevated from the soil and open the hoses when the plows are lowered into the soil, and a tank for supplying nitrogenous liquid to said hoses and nozzles, said tank being mounted on the tractor at a sufficient elevation to supply a gravity head to the hoses and nozzles, and a conduit between the tank and the hoses.

References Cited in the file of this patent

UNITED STATES PATENTS

| | | |
|---|---|---|
| 495,304 | Clow | Apr. 11, 1893 |
| 1,014,655 | Larose | Jan. 16, 1912 |
| 1,340,828 | Heap | May 18, 1920 |
| 1,432,882 | Lobl | Oct. 24, 1922 |
| 2,396,980 | Blue | Mar. 19, 1946 |
| 2,430,741 | Smith | Nov. 11, 1947 |
| 2,594,284 | Blue | Apr. 29, 1952 |

OTHER REFERENCES

Agricultural Engineering, September 1947 (pages 394–396). (Copy in Division 1.)